3,303,184
AMINOETHYL GUMS AND PROCESS FOR
PREPARING SAME
Robert Nordgren, Minneapolis, Minn., assignor to General Mills, Inc., a corporation of Delaware
No Drawing. Filed May 25, 1965, Ser. No. 458,777
15 Claims. (Cl. 260—209)

This invention relates to aminoethyl ethers of gums and to the process of preparing same. In particular it relates to the aminoethyl ethers of tamarind gum and polygalactomannan gums such as guar and locust bean gum, prepared by reacting the ethylenimine with the gum.

It is therefore an object of this invention to provide aminoethyl ethers of tamarind and polygalactomannan gums.

It is also an object of this invention to provide a process for preparing said products.

These and other objects of the invention will be apparent from the following description.

The invention is applicable to the unmodified polygalactomannan gums and tamarind gums. The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1–6 linkage on alternate mannose units. The ratio of galactose to mannose in the guar polymer is, therefore, one to two. Locust bean gum is also a polygalactomannan gum of similar molecular structure in which the ratio of galactose to mannose is one to four. Guar and locust bean gum are the preferred sources of the polygalactomannans, principally because of the commercial availability thereof. Tamarind gum is a mixture of polysaccharides, one typical composition being D-galactose—17%, D-glucose—53% and D-xylose—30%.

The aminoethyl ethers of these gums are readily prepared by merely mixing the gum with the ethylenimine, generally in a closed reactor for a time sufficient for reaction of substantially all of the ethylenimine. This represents an unexpected feature of the present invention in that it is generally necessary when forming adducts of these gums to first swell the gum in water and to use a catalyst such as sodium hydroxide or an amine salt, as in the case of preparing acrylonitrile adducts. However, when using such a system with ethylenimine and guar gum, it was found that no adduct formed. It was thus entirely unexpected and surprising to find that a substantially dry guar flour could be reacted with ethylenimine by merely mixing the reactants in a closed reactor for a time sufficient for reaction to take place. No water or catalyst is necessary. Further advantages lie in the fact that the product requires no drying or grinding and the product is ready for use without further processing. Another advantage over products prepared with an aqueous system and an alkaline catalyst is that such a system tends to depolymerize the guar polymer so that its usefulness is impaired, particularly in flocculation and paper applications. In the process of the present invention, the ash content and granulation of the product does not change and the viscosity of the solution prepared from the cationic product is only slightly less than that of the unmodified guar, thus indicating very little, if any, depolymerization.

The products of this invention are useful as flocculants and possess advantages over unmodified gum products in the flocculation of slimes of lead, zinc, potash, phosphate, iron and kaolin. Also, these products increase the dry strength of paper.

As indicated, the reactants are merely placed in a reactor capable of being closed or sealed and equipped with a means for agitation, such as a stirrer or mixer. Temperatures are preferably near room temperature, although higher and lower temperatures may be used with varying degrees of success. In general, temperatures of 20–60° C. are found to be satisfactory, while temperatures in the range of 25–55° C. are preferred. At temperatures higher than 60° C., it is necessary to employ a pressure reactor. At temperatures below 20° C., the rate of reaction is considerably slower. The time should be sufficiently long to permit substantially complete reaction. At short time periods, the reaction may not be complete and the reaction efficiency and degree of substitution will be low. Useful products were found to be those having a degree of substitution (D.S.) of from about 0.005 to about 3.0. However, it is generally not necessary to exceed a degree of substitution of about 0.3 and the most preferred products have a D.S. of from 0.01 to about 0.15. In general, time periods in excess of one hour are preferred to provide adequate reaction efficiency in the temperature range discussed hereinabove. The time for reaction is, of course, less for the higher temperatures of reaction. In general, at temperatures in the range of 25–55° C., times of from 1.5–6 hours will be satisfactory. It is quite common, however, to allow the reactants to stand overnight, about 18 hours, which ensures complete reaction.

The proportions of the reactants can vary over a relatively wide range to provide varying degrees of substitution. Very satisfactory products have been prepared employing from 0.01 to 0.3 equivalent of ethylenimine per equivalent of guar gum or from about 0.2 to 6.5% ethylenimine by weight. There is generally no reason to exceed 1.0 equivalent per equivalent of gum (anhydrous hexose unit).

As indicated, the reaction is conducted on a substantially dry gum as commercially available. Conventionally, the gums as available will have a moisture content in the range of about 5 to 15% water by weight. The gums remain substantially dry at moisture contents approaching 50% by weight. By this we mean they are damp powders and are not aqueous slimes such as would be the case with starch. It is generally preferable that the gum possesses a minimum moisture content of about 5% by weight for the reaction to proceed properly. The reaction is preferably carried out with the gum in a finely divided form. By this is meant that about 90% of the gum should pass through a 100 mesh screen, that is, be less than 149 microns in size.

The following specific examples are furnished for the purpose of illustration only and are not to be construed as placing any limitations on the scope of the present invention.

EXAMPLE I

Into a 500 ml. three-necked flask fitted with a thermometer, water-cooled condenser and a half-moon stirrer were added:

(1) 100 grams of guar flour (0.5 equivalent)
(2) 2.15 grams of ethylenimine (0.05 equivalent).

This mixture was stirred for 4.5 hours at 25–29° C. and the product was then spread out in a thin layer to allow the unreacted ethylenimine to evaporate. The percent nitrogen of the product was 1.20 while percent nitrogen of the unmodified guar was 0.70. This indicates a degree of substitution (D.S.) of 0.074 aminoethyl groups per 200 grams of guar. The efficiency of the reaction was 74%.

EXAMPLE II

The experiment of Example I was repeated with these exceptions. Twice as much ethylenimine was used and the reaction was run for 2.5 hours at 50° C. The percent nitrogen was 1.83 indicating a D.S. of 0.168 and a reaction efficiency of 84%.

EXAMPLE III

The same reactants as in Example I were charged to a 250 ml. three-necked flask fitted as above. After mixing for 1.5 hours at 55° C., the reaction product was spread out in a low temperature oven to remove any unreacted ethylenimine. The percent nitrogen was 1.31 which indicates a D.S. of 0.09 and a reaction efficiency of 90%.

EXAMPLE IV

The same equipment and reactants used in Example III were used. The reaction was run for 2 hours at 50° C. and then allowed to stand at room temperature overnight. This time a part of the sample was extracted with methanol to remove any unreacted ethylenimine. The percent nitrogen of the sample was 1.30 and the percent nitrogen of the methanol extracted sample was 1.26. The values are equivalent to D.S. of 0.088 and 0.082, respectively.

EXAMPLE V

The experiment of Example IV was repeated. This time the reaction was run for 2.5 hours at 50° C. and then allowed to stand two days at room temperature before extracting a part of the sample with methanol. The percent nitrogen of the product was 1.35 and the methanol extracted sample was 1.32. The values are equivalent to D.S. of 0.096 and 0.091, respectively.

EXAMPLE VI

The following were added to double-bladed steel mixer:
(1) 1,000 grams of guar flour (5 equivalents)
(2) 5.4 grams of ethylenimine (0.125 equivalent).

The reactor was sealed, the mixing blades turned on and the reactor heated at 38° C. for one hour. The product was spread out to allow the unreacted ethylenimine to evaporate. The percent nitrogen was 0.77 indicating a D.S. of 0.01 and reaction efficiency of only 40%. Subsequent experiments showed that the following times were preferred to obtain 70–80% reaction.

Table I

|  | At ° C. |
|---|---|
| 1.5 hours or less | 55 |
| 2.5 hours or less | 50 |
| 3.0 hours | 40 |
| 4.5 hours or longer | 30 |

Examples III, IV and V indicate that over 90% reaction can be obtained by following the schedule in Table I and then allowing the reaction mixture to stand for longer periods in a closed container to complete the reaction.

EXAMPLE VII

A pilot plant Littleford mixer of 3.3 cubic ft. capacity was employed in this experiment. This mixer has mixing blades that scrape the sides and in addition, has a separate propeller which creates excellent mixing. Into this equipment was charged 40 pounds of a guar flour of a slightly different manufacturing grade than was used in the previous examples. The reactor was sealed and the mixing started while 190 grams of ethylenimine (0.05 equivalent) were sprayed in under pressure of nitrogen gas. The reactor was then heated at 50° C. for two hours, cooled to room temperature and then discharged into a polyethylene bag and sealed for three days. At the end of the three day period, there was almost no odor of ethylenimine indicating no unreacted ethylenimine was present. The percent nitrogen of the product was 0.92 and the percent nitrogen of the unreacted guar was 0.59. This indicates a D.S. of 0.048 and a reaction efficiency of 96%.

The following examples of experiments show how various aminoethyl guar products have been used to flocculate the fine particles shown as "slimes" in various commercial and synthetic ore concentrates.

EXAMPLE VIII

A clay slime from a commercial potash ore was treated with guar and cationic guar products of this invention having the D.S. indicated, at the level of 10 parts per million based on the weight of the slime slurry. The slime slurry was added to the 500 ml. mark in graduated cylinders and the appropriate amounts of flocculant added. The cylinders were stoppered and inverted several times to mix the additive. The rate of settling of the flocculated solids was then observed as follows:

| Time to Settle to— | Control (No Additive) | Unmodified Guar | Aminoethyl Guar (D.S. 0.02) |
|---|---|---|---|
| 400 ml. mark | 120 seconds | 30 seconds | 21 seconds. |
| 300 ml. mark | 170 seconds | 45 seconds | 36 seconds. |
| 200 ml. mark | 220 seconds | 60 seconds | 46 seconds. |
| 100 ml. mark | 260 seconds | 75 seconds | 61 seconds. |

These data show the flocculation and settling of this slime was best accomplished with the cationic guar product of this invention.

EXAMPLE IX

A clay slime from a commercial phosphate ore was treated with guar and an aminoethyl ether of guar of a D.S. of 0.02 at a level of only 4.5 parts per million. The results are expressed as the volume in mls. of the flocculated solids after various periods of time.

| Time in Minutes | Volumes of Flocculated Solids | | |
|---|---|---|---|
|  | Control (No Additive) | Guar | Aminoethyl Guar |
| 0 | 500 mls | 500 mls | 500 mls. |
| 8 min | 480 mls | 412 mls | 405 mls. |
| 40 min | 345 mls | 184 mls | 178 mls. |
| 64 min | 246 mls | 164 mls | 158 mls. |
| 80 min | 200 mls | 154 mls | 150 mls. |

The aminoethyl guar was a better flocculant than the unmodified guar.

EXAMPLE X

In this experiment three commercial iron slimes were used and one synthetic slime composed of a dispersion of kaolin coating clay. Four different aminoethyl ethers of guar were compared with unmodified guar with respect to the rate of settling when these slimes were flocculated with small amounts of the guar products. The experiments were carried out in nongraduated cylinders and the rate of settling in each series designated by a number from one to five. The smallest number designates the fastest rate of settling. The results are tabulated below:

|  | Rate of Settling | | | |
|---|---|---|---|---|
|  | Iron Slime No. 1 | Iron Slime No. 2 | Iron Slime No. 3 | Kaolin Coating Clay |
| Unmodified Guar | 5 | 5 | 4 | 5 |
| Aminoethyl Guar D.S.=0.010 | 2 | 4 | 3 | 3 |
| Aminoethyl Guar D.S.=0.025 | 3 | 3 | 4 | 4 |
| Aminoethyl Guar D.S.=0.057 | 1 | 2 | 2 | 1 |
| Aminoethyl Guar D.S.=0.097 | 1 | 1 | 1 | 2 |

EXAMPLE XI

Use of aminoethyl guar products as a paper additive

One of the largest uses of guar is to improve the dry strength of paper when added to the pulp as a so-called "wet-end" additive. On some paper machines this additive may slow down the drainage so the paper machine cannot be operated as fast. Aminoethyl guar products have been tested as dry strength additives and show improvement in dry strength. In addition, these products do not have an adverse effect on the drainage time and even improve drainage. These products were tested as follows:

Hand sheets were made from unbleached kraft pulp containing alum. Various amounts of the guar products were added to the pulp before the sheets were formed. The dry strength of the paper was tested with a Mullen tester and the values recorded are the pounds burst per 100 pounds ream weight of paper.

The data follow:

|  | No Additive | 0.25% Additive | 0.50% Additive | 1.0% Additive |
|---|---|---|---|---|
| Unmodified Guar | 127.5 lbs | 140 lbs | 141 lbs | 147 lbs. |
| Aminoethyl Guar D.S.=0.010 | 127.5 lbs | 139 lbs | 143 lbs | 147 lbs. |
| Aminoethyl Guar D.S.=0.057 | 127.5 lbs | 142 lbs | 143 lbs | 147 lbs. |
| Aminoethyl Guar D.S.=0.097 | 127.5 lbs | 137 lbs | 141 lbs | 148 lbs. |

Using the same technique, aminoethyl ethers of locust bean and tamarind gums were prepared by reaction with ethylenimine. With the locust bean gum, a 0.091 degree of substitution and reaction efficiency of 91% was obtained. With tamarind gum, a 0.082 degree of substitution and reaction efficiency of 82% resulted.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing aminoethyl ethers of a gum selected from the group consisting of a polygalactomannan gum and tamarind gum comprising agitating a mixture of ethylenimine and a substantially dry gum for a time sufficient for said ethylenimine to react with said substantially dry gum.

2. A process as defined in claim 1 in which said reaction is conducted at a temperature in the range of 20–60° C.

3. A process as defined in claim 2 in which the reaction is conducted for a time of from 1 to 6 hours.

4. A process as defined in claim 1 in which said substantially dry gum has a moisture content by weight of from 5 to 50%.

5. A process as defined in claim 1 in which said substantially dry gum has a moisture content by weight of from 5 to 15%.

6. A process as defined in claim 1 in which said ethylenimine is employed in an amount of from 0.01 to 1.0 equivalent per equivalent of said gum.

7. A process as defined in claim 1 in which said ethylenimine is employed in an amount of from 0.01 to 0.3 equivalent per equivalent of said gum.

8. A process as defined in claim 1 in which said gum is locust bean gum.

9. A process as defined in claim 1 in which said gum is guar gum.

10. A process as defined in claim 1 in which said gum is tamarind gum.

11. A process of preparing aminoethyl ethers of gums comprising agitating a mixture of ethylenimine and a substantially dry gum having a moisture content by weight of from 5 to 50% and being selected from the group consisting of a polygalactomannan gum and tamarind gum for from 1 to 6 hours at a temperature of from 20 to 60° C., said ethylenimine being employed in an amount of from 0.01 to 1.0 equivalent per equivalent of said gum.

12. The aminoethyl ether of a gum selected from the group consisting of polygalactomannan and tamarind gums.

13. The aminoethyl ether of guar gum.

14. The aminoethyl ether of locust bean gum.

15. The aminoethyl ether of tamarind gum.

No references cited.

JAMES O. THOMAS, JR., *Acting Primary Examiner.*
JOHNNIE R. BROWN, *Assistant Examiner.*